United States Patent
Kolossow

[11] Patent Number: 6,074,084
[45] Date of Patent: Jun. 13, 2000

[54] EXTRUDER FOR PLASTICS

[75] Inventor: Klaus Dieter Kolossow, Hambühren, Germany

[73] Assignee: Gefinex-Jackson GmbH, Steinhagen, Germany

[21] Appl. No.: 09/063,575

[22] Filed: Apr. 21, 1998

Related U.S. Application Data

[63] Continuation-in-part of application No. PCT/EP96/04556, Oct. 21, 1996.

[51] Int. Cl.[7] .................................................. B29C 47/42
[52] U.S. Cl. ............................................ 366/84; 366/144
[58] Field of Search .................................... 366/79, 82, 83, 366/84, 85, 86, 144; 425/204, 208, 209

[56] References Cited

U.S. PATENT DOCUMENTS

| | | | |
|---|---|---|---|
| 3,929,322 | 12/1975 | Hanslik | 366/85 |
| 4,192,617 | 3/1980 | Spielhoff | 366/83 |
| 4,686,088 | 8/1987 | Fritsch | 366/85 |
| 4,889,430 | 12/1989 | Mueller | 366/85 |
| 5,265,955 | 11/1993 | Guggiari | 366/85 |
| 5,476,319 | 12/1995 | Blach | 366/83 |
| 5,510,073 | 4/1996 | Kaegi et al. | 366/84 |

FOREIGN PATENT DOCUMENTS 0244591  11/1987  European Pat. Off. .

*Primary Examiner*—Tony G. Soohoo
*Attorney, Agent, or Firm*—Nils H. Ljungman & Associates

[57] ABSTRACT

An extruder comprising several zones, including at least a plasticizing and mixing zone, a residence, mixing and cooling zone, and a mixing and cooling zone being constructed as planetary-roller extruders, the zones being substantially shut off from one another by blisters, and being connected to one another via melt pipes and intermediate pumps.

1 Claim, 1 Drawing Sheet

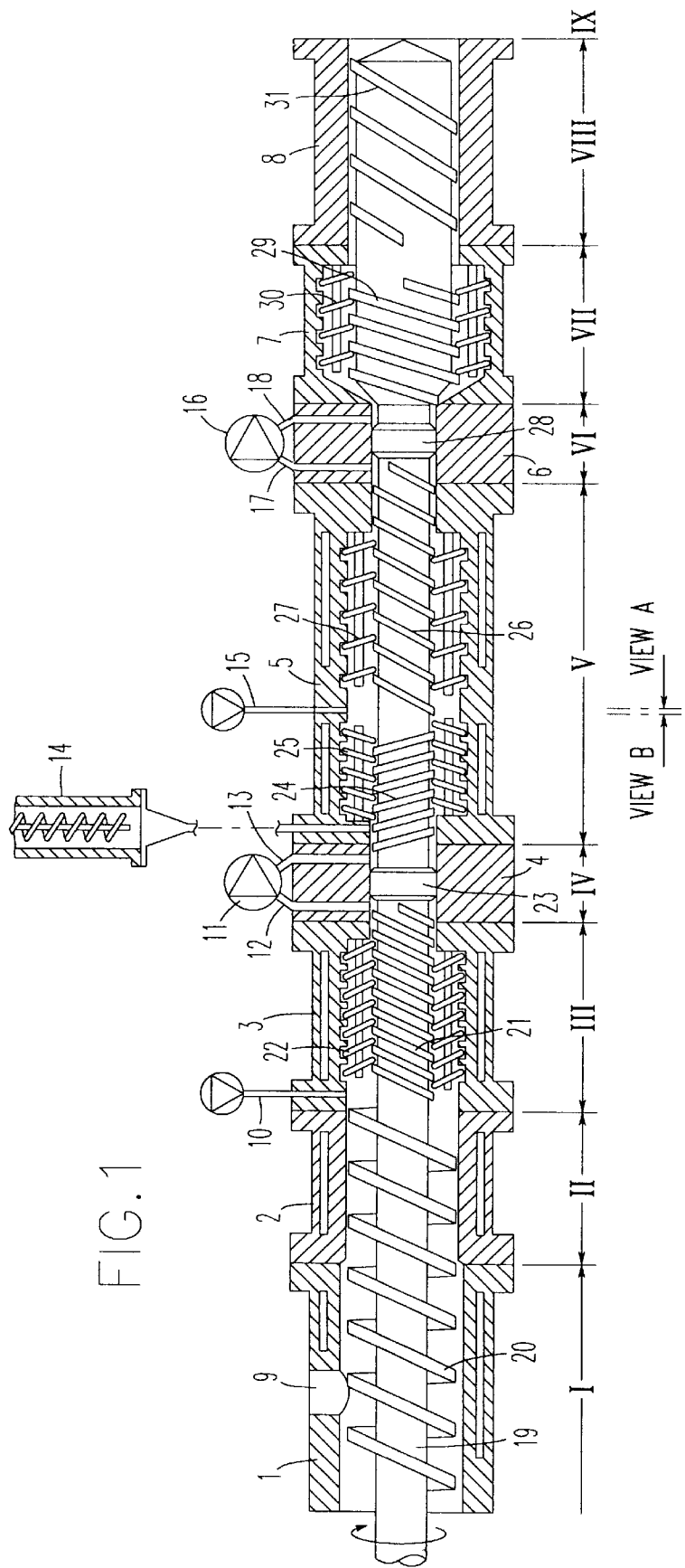
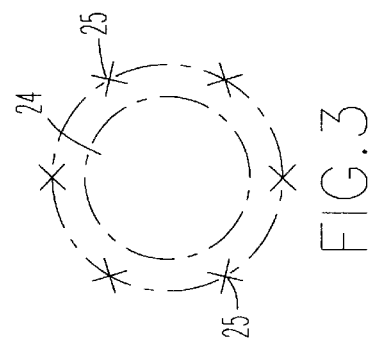
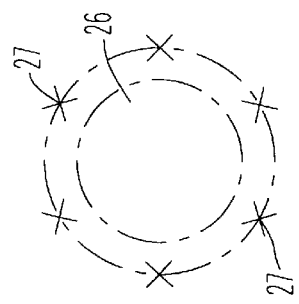
FIG. 1
FIG. 2
FIG. 3

EXTRUDER FOR PLASTICS

CONTINUING APPLICATION DATA

This Application is a Continuation-In-Part of International Patent Application No. PCT/EP96/04556, filed on Oct. 21, 1996, which claims priority from Federal Republic of Germany Patent Application No. 195 39 203.5, filed on Oct. 21, 1995, having Publication Number WO97/15433, published on May 1, 1997, in which the United States of America was a designated state and in which the United States of America remains a designated state as of the filing of the Patent Application. International Application No. PCT/EP96/04556 was pending as of the filing date of this application.

BACKGROUND OF THE INVENTION

1. Field of the Invention

The present invention relates to an extruder, especially for the foam extrusion of plastics, also for the incorporation of additives and aerating agents, preferably with the supply of relatively high-viscosity or low-viscosity polymers via a lateral-arm extruder, and also cooling to unmoulding temperature and supply into a moulding tool, with a pump being connected between at least two stages or zones.

2. Background Information

The extrusion of foamed plastics has gained increasing importance. Accordingly an extensive development is recorded. Various structural shapes for extruders have arisen. Belonging thereto are single-screw extruders, twin-screw extruders and also planetary extruders. The starting material basis for extrusion has become more diverse. Apart from the starting material, additives and aerating agents are also of importance. In the field of aerating agents the specialist world first turned to fluorocarbons. These aerating agents can also result in good foaming results under difficult general conditions. Unfortunately these aerating agents had to be abandoned again, because a very great environmental threat was posed by them. Alternatively available aerating agents are all less desirable solutions.

Extruded materials produced by an extruder of this type can take many forms. For example molded plastics such as household or automotive moldings and trim can be constructed. Additionally, materials such as plastic lumber can be formed from the extrusion process. Styrofoam and other foamed styrene type materials can also be produced by such an extrusion process. The extrusion process can also be used to make intermediate plastics, which can then be transferred to subsequent processing operations to make finished products.

In view of the above background the separation of the extrusion operation into different zones and stages achieves ever greater importance, because in the individual zones an influence can be specifically exerted on the charged material. The distinction of the following zones has been known for a long time:

feeding/filling conveying/compression degassing incorporation of liquid and solid additives and also of other polymers incorporation of aerating agents homogenisation plasticising cooling discharge These zones can be found together or partially on a single extruder. In other words, the extrusion process can be designed such that all of the zones or some combination of the zones can occur on a single extruder. Alternatively, multiple extruders can be used in such a manner that the individual zones can each occur on a different extruder, or that a single zone can occur on a series of several extruders. However the zones may also be divided over several extruders. Then multi-stage extrusion plants are frequently spoken of. A typical form of multi-stage extrusion is the so-called extrusion in cascades. In this case two extruders, for example, work together in such a manner that the one extruder charges its melt into the other extruder. In other words, one of the extruders can supply the product from that extruder to another extruder for further processing.

The above multi-stage term is to be distinguished from a multi-stage production process. The latter is mentioned, in particular for the manufacture of cross-linked plastics, and also plastic foams.

The longer the screw, the more work consumed by friction is to be overcome. In other words, a longer screw causes a greater frictional energy loss and that energy loss must then be overcome. To overcome the friction, more and more energy has to be supplied. At the same time limiting temperatures may not be exceeded. This compels an intensive cooling of different extruder zones. Apart from structural and operational expenditure caused thereby, this results in an extreme energy expenditure, which is again destroyed in the course of cooling.

OBJECT OF THE INVENTION

The object of the present invention is to reduce the energy expenditure for the extrusion. For this the present invention adopts a relatively old proposed solution which specifies the provision of a pump between at least two stages. The proposal has the very positive extra feature of representing the necessary pressure build-up for the mixing, homogenisation etc. by means of the intermediate pump. The pump is supposed to accomplish the pressure build-up where it is needed, so that the screws are completely or partially relieved of the work of pressure build-up and can limit their activity to the function desired in each case, e.g. homogenisation. However it has not yet been possible to achieve the proposed solution in practice.

SUMMARY OF THE INVENTION

The invention sees the possibility of helping the breakthrough to the above proposed solution by using planetary roller extruder sections. In other words, the present invention provides planetary roller extruder sections in order to facilitate the use of the pump between the two stages. According to the present invention therefore out of two zones/stages connected by the pump, at least one is constructed as a planetary roller extruder section. The planetary roller extruder is distinguished from all other extruders by a higher specific mixing and homogenising capacity and in the case of cooling by a higher specific cooling capacity. However the planetary roller extruder is by nature less suitable for a pressure build-up. This is attributed to the fact that a considerable hollow space can exist between the planetary spindles rotating on the central spindle.

According to the present invention this does not have a disadvantageous effect because the pump is in the position to represent any desired pressure, depending on the design. This applies in particular for gear pumps. In other words, and in accordance with one embodiment of the present invention, the pump can be positioned and designed to provide any pressure desired to optimize the process.

The present invention turns the disadvantage of the planetary spindles into an advantage by being able to set an optimal residence time in the extruder with a further reduction in the conveying action in the planetary roller extruder by means of the pump. The start-up of the extruder is facilitated by means of the pump, because only after reaching an optimal degree of admission in the extruder and optimal residence time does the pump further convey the charged material. The reduction of the conveying action may be achieved by:

Choosing a smaller number of planetary spindles,
  choosing a different arrangement of planetary spindles on the reference diameter of the internal toothing, i.e. displacement to produce a greater distance between the spindles of individual pairs of spindles,
  choosing different toothing
  choosing a different spindle pitch and even an opposed arrangement.

In a further embodiment of the present invention, the plasticising or melting and mixing zone and/or the residence, mixing and cooling zone and/or the mixing and cooling zone are provided with a planetary roller extruder section. In these regions the setting of an optimal residence time is of particular advantage. A corresponding state of affairs applies for the use of planetary roller extruder portions for an upstream feed zone or filling zone and/or for a downstream discharge zone.

Particularly favourable conditions are produced with the use of amorphous, crystalline and partially crystalline thermoplastics. These are in particular polystyrene (PS), polyethylene (PE) or polypropylene (PP) or comparable plastics, also copolymers of PE, PP and PS, with a single-stage extruder having the following division of sections:

Sections I and II: supply of starting material and feed (solids mixture comprising several constituents) and melting by means of single-screw shaft and grooved cylinder body surface, which conveys at constant pressure into a downstream planetary part.

Section III: Plasticising and homogenisation of the polymer mixture with a very low energy supply with optimal temperature control, variable choice of number of planetary spindles.

Section IV: Deflection of the homogenous melt by a blister on the screw shaft into the melt filter with a sieve changing device and subsequently into the gear pump, which pump constantly fills the following process section with melt with minimum energy expenditure.

Section V: The degree of admission and consequently the residence time may be controlled independently of the main speed of the screw shaft of the extruder in the residence, mixing and cooling zone V, which at the same time forms a pressure chamber. In this case apart from the residence time in the section, the advantage of influencing the pressure level is used. Added to this is the advantage of supplying either additionally melted-on high-viscosity or low-viscosity alternative additives or other additives embedded in polymers to the main stream of melt by a bypass or lateral-arm extruder.

Mixing takes place in a planetary roller section, the pitch of which planetary roller section is constructed opposed to the main pitch. This opposing pitch produces an additional increase in the mixing action and residence time. Furthermore a substantial part of the force action on the mechanism is counter balanced thereby. In the section the feed of further liquid and/or gaseous aerating agents and/or additives takes place. Homogenisation and cooling takes place by the planetary sub-section following the feed. In this case the additional advantage can lie in the distribution of the planetary spindles over the periphery.

In this planetary roller extruder section the planetary spindles of the front section of the planetary roller extruder are disposed offset respect to those of the rear planetary roller extruder section, as a result of which offset an improvement in the melt stream mixture and also of the homogenization can be achieved.

Section V (reaction chamber) is limited by a blister on the screw shaft and the diversion of the melt into a further gear pump. The gear pump assumes the function of a control element or control valve and simultaneous pressure generation in order to fill the following extruder section and to produce the necessary pressure for charging the moulding tool with the very low energy supply. In this case the diameter may optionally be increased in this extruder section in order to make available a larger cooling surface, whereby it may however be expedient to reduce the number of planetary spindles in order to compensate for the higher peripheral speed (heat generation) inevitably resulting from the larger diameter.

In other words, and in accordance with at least one embodiment of the present invention, the gear pump in the reaction chamber simultaneously functions as a pressure generation source and a control element or valve. The gear pump produces the pressure necessary to charge the moulding or molding tool.

When choosing a smaller diameter, the contact of the melt on the cylinder surface for the purpose of heat elimination can be increased via an increased number of planetary spindles and the length of the section. In at least one embodiment of the present invention, the contact area can be increased by increasing the length of the portion of the cylinder surface in contact with the melt.

Afterwards the screw shaft can be constructed as a single screw (pump zone) to kill the stream of melt, whereby the diameter may additionally be influenced.

The discharge screw can preferably have a multi-flighted, e.g. four-flighted, construction.

The discharge zone is relatively important. It is a deciding factor in the quality of the melt entering into the extrusion tool. In accordance with the present invention a particular standardisation of the melt also can occur in the discharge zone. The standardisation also can reduce a pressure pulse, which emanates from the rotating planetary spindles of the planetary roller extruder section which is the last section in the direction of transport the melt. The pressure pulses suffer an increase loss in effect the larger the distance to the discharge end of the extruder is. In accordance with the present invention the distance from the discharge end of the extruder/tool is at least 0.1 D, with D being the external diameter of the screw which is adjacent to the last planetary roller extruder section.

In this respect it may be of considerable advantage to integrate a porcupine head and/or a calming pipe into the discharge zone. The porcupine head originates from a screw, by a left-handed similar screw also being milled over the e.g. right-handed screw threads. As a result of the previous screw only sections remain, which give the image of the spines of a porcupine. The length of the porcupine head specified by the invention is 0.5 to 1.5 D, with D being the reference diameter of the porcupine discharge screw. The porcupine head again causes an intensive thorough mixing of the melt. The melt can again be killed in the downstream calming pipe. The calming pipe may be a simple pipe or components.

With all details the discharge zone may have a length of 1 to 5 D, with D being the reference diameter of the central spindle/screw in the discharge zone.

In the mixing zone (without cooling) the melt temperature is preferably between about 140 and 240 degrees Celsius depending on the plastics, in the application to polystyrene roughly 200 degrees Celsius, to polyethylene roughly 140 degrees Celsius and to polypropylene roughly 240 degrees Celsius. Particularly with copolymers having PP higher temperatures may become necessary. Provided that an external heat supply is necessary to achieve this temperature, this can occur by means of heating the extruder casing. The heating may be represented e.g. with hot pressurised water or oil. The heating medium flows through ducts on the extruder casing. These ducts can be represented particularly favourably by means of a two-shell extruder casing. The necessary recesses may be incorporated in the shells, as long as the shells are divided.

In the cooling zone (without intensive mixing) the melt is preferably cooled down to 220 to about 110 degrees Celsius: PE to roughly 110 degrees Celsius, PS to roughly about 120 to about 130 degrees Celsius and PP to roughly 130 to 160 degrees Celsius.

For cooling, cooling medium can flow through the extruder casing in a corresponding application of the heating method described above.

The varying design of the planetary roller extruder sections and of following or preceding sections which is described above may basically be used to optimise the individual extruder sections. This includes the change of the reference diameter of the internal toothing interacting with the planetary spindles and/or the change of the number of planetary spindles and/or a different arrangement of the planetary spindles on the reference diameter of the internal toothing and/or a change in length and/or a change in the spindle pitch and/or a change in the toothing.

Such changes to certain roller extruder sections are in sharp contrast with the general developmental direction of the present invention. Generally in the region of the planetary roller extruders the attempt is made to construct the sections substantially the same. Different requirements can be taken into consideration by changing the number of sections disposed one behind the other and by using different, but otherwise identical types. The distinction of the types occurs according to the diameter. E.g. there are extruder sections of about 150, 200, 250 and 300.

The departure, according to the present invention, away from the general direction of development is also of significance irrespective of the question of whether a pump is connected between two extruder sections. In other words, the beneficial advantages of the present invention can occur whether or not a pump is connected between the extruder sections.

The present invention has also recognised that it may be advantageous for the clearance between the teeth of the planetary roller extruder to change. In the region of the cooling zone an enlargement of the clearance promotes cooling, and in the feed and compression zone a minimal clearance promotes the conveying action of the extruder.

Grooves in the cylinder surrounding the screws can also have the same effect in the feed and compression zone with the use of single-screw extruder sections. In accordance with the present invention the grooves can extend in the longitudinal direction or spirally in the direction of transport. The basis of this direction of the grooves is the consideration that the plastics are charged in granulate form. The grains arrive cold in the feed screw and are moved forwards in the direction of transport by the screw without any substantial change in position. This occurs until the granulate grains arrive in the heated extruder region and there adhere to the raw, heated cylinder faces. Then the granulate grains begin to roll. By the rolling motion the faces of the granulate grains in contact with the heated cylinder face are changed. The granulate grains are heated on all sides, so that the melting of the granulate grains begins. In normal single-screw extruders pressure builds up only therewith. No pressure build-up arises in front of this region because the polished screw surface displays essentially no friction with the granulate grains.

By the grooves specified by the invention the grains of granulate become wedged between the teeth of the screw and the grooves of the cylinder. The grains of granulate are inevitably moved in the direction of transport. The pressure build-up associated therewith can shorten the necessary overall length for the inlet and feed zone and the compression zone. The grooves can extend at least over a length of 1 D, with D being the reference diameter of the screw. A length of 3 to 4 D is preferable. A single-flighted feeding screw is favourable in this case. The design, described above, of the clearance and the grooves in the cylinder can be used independently of the other features described above and are advantageous.

In a further embodiment of the present invention the planetary spindles of various zones and sections may possess an opposed pitch. Consequently the forces emanating from the opposed sections can be largely counterbalanced. This quite considerably can assist the construction of the extruder. Two adjacent planetary roller sections having opposite planetary spindles preferably possess a common wearing ring.

According to the present invention the opposed pitch does not necessarily result in an interruption of transport. According to the present invention the planetary roller extruder section which is the rear one in the direction of transport of the melt and which conveys in the opposite direction can be overrun. This means that the conveying force of the extruder section conveying against the general direction transport of the extruder is, in accordance with the present invention, clearly smaller than the force of the flowing melt. At the same time, by virtue of its design, this planetary roller extruder section can have a sufficient flow aperture for the melt in the general direction of transport. The extruder section which in accordance with the present invention works against the general direction of transport can produce an extremely thorough mixing of the melt and in the cooling zone an extreme cooling action. This can also be used irrespective of whether the different extruder sections are connected to one another by a pump. The planetary roller extruder section which conveys in the opposite direction may advantageously be overrun with another extruder section of another design, e.g. a single-screw section or a double-screw section.

The necessary conveying pressure for overrunning the planetary roller extruder section working in the opposite direction can be produced by the planetary roller extruder section working in the direction of transport or by the pump between the two extruder sections which is preferably provided here.

With the use of a single-stage extruder with planetary roller extruder sections for the residence, mixing and cooling zone and for the plasticising and mixing zone, the plasticising and mixing zone preferably conveys in the opposite direction.

In the case of two planetary roller extruder sections conveying in opposite directions, the planetary spindles of both sections may run towards a common wearing ring. This is also independent of the connection of the extruder sections via a pump.

Further structural advantages can be produced in a manner known per se by a common central spindle or shaft for various extruder sections.

To shut off the extruder zones or sections, blisters are preferably provided on the central spindle. This is in each case a collar formed as desired, which collar completely fills the cylinder bore, which bore at this position has no teeth, leaving just a clearance. The clearance can be selected so that essentially no melt flows past the blister, or the clearance can be selected so that a thin stream of melt flows over the blister. This means the blister completely or partly shuts off the extruder sections. In other words, and in accordance with at least one embodiment of the present invention, the blister can be disposed to partially or completely shut off the extruder sections.

For the manufacture of foam plastics, the supply of aerating agent preferably takes place in the plasticising and mixing zone or in the residence, mixing and cooling zone. Provided that a blister is disposed in front of the respective zone, favourable conditions can be produced if the feed of aerating agent takes place after the blister. Consequently at this point the present invention also turns away from a direction of development with planetary roller extruders according to which the metering of auxiliary agents etc. takes place at the wearing ring between the extruder sections.

For the application to polystyrene extrusion, an injection pressure of 40 to 50 bar in the planetary roller extruder section may be adequate. The addition of aerating agents specified by the present invention may advantageously also be used independently of whether a pump is provided between two extruder sections.

The planetary roller extruder sections in the further zones can be selectively combined with a single-screw extruder in the feed or inlet zone. In this case the screw of the single-screw extruder section may at the same time form the central spindle for a downstream planetary roller extruder section or vice versa the central spindle at the same time forms the screw.

In the event of the use of a twin-screw extruder section for the feed or inlet zone, one of the screws may at the same time be connected to the central spindle as the screw of the single-screw extruder section. This screw of the double-screw extruder section may be longer than the second screw or be offset in relation to the second screw in such a manner that it protrudes in relation to the second screw in the direction of transport and assists the structural design. This may also be advantageous for other extruders independently of whether a pump is used between two extruder sections.

A sealing screw is also preferably provided in front of the feed screw or the inlet screw. In this case "disposed in front of" means: arrangement on the inlet side. The sealing screw optionally has a length of 1 to 3 D, with D again being the reference diameter of the sealing screw. The sealing screw is expediently a part of the central spindle of the following planetary roller extruder section and vice versa. It is favourable to construct the sealing screw with a single flight. Then the sealing action in relation to the screw length is the greatest.

At the end which is faced away from the planetary roller extruder section the sealing screw may be sealed with a stuffing box and lid. A graphite Teflon packing possessing a cord having a rectangular or square cross section is preferably provided for the stuffing box. Moreover the region of the screw shaft without the formation of a profile (smooth) in the surface for the packing is advantageous.

During assembly it may be advantageous if the external radius of the path of movement of the rotating planetary spindles of a planetary roller extruder section in the flow direction of the melt is smaller than the external radius of the path of movement of the planetary spindles of the following planetary roller extruder section. The planetary spindles can then be assembled more easily. A slight variation is adequate for this. The variation may also be up to about 20%.

The above discussed embodiments of the present invention will be described further hereinbelow with reference to the accompanying figures. When the word "invention" is used in this specification, the word "invention" includes "inventions", that is, the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

Embodiments of the present invention are described in greater detail below, with reference to the attached drawings, in which:

FIG. 1 shows an embodiment of an extruder having multiple extruder sections;

FIG. 2 shows a sectional view of view B in FIG. 1; and

FIG. 3 shows a sectional view of view A in FIG. 1.

DESCRIPTION OF THE PREFERRED EMBODIMENT

An exemplified embodiment of the invention is represented in the drawings. FIG. 1 shows an extruder having various housing sections 1, 2, 3, 4, 5, 6, 7 and 8. Each housing section 1, 2, 3, 4, 5, 6, 7, 8 corresponds to an extruder section. Housing section 1 belongs to a feed zone I, housing section 2 to a melting zone II, housing section 3 to a plasticising and mixing zone III, housing section 4 to a shut-off zone IV, housing section 5 to a residence, mixing and cooling zone V, housing section 6 to a shut-off zone VI, housing section 7 to a mixing and cooling zone VII and housing section 8 to a discharge zone VIII. Zones III, V and VII are constructed as planetary roller extruder sections, zones I and II form a feed and melting screw, and zone VIII a discharge screw. The planetary roller extruder sections 3, 5, 7 possess (toothed) central spindles 21, 24, 26, and 29 and with the screws 19 and 31 form a common shaft (central spindle). Planetary spindles 22, 25, 27 and 30 also belong to the planetary roller extruder sections. The planetary spindles 22, 25, 27, 30 possess the same toothing as the central spindles and mesh firstly with the central spindle and secondly with the inner toothing of the extruder casing. Accordingly the extruder casing is provided with the same toothing as the planetary spindles and the central spindle. The reference diameter of the internal toothing in the housing or of the inserted bushing is normally the characterising dimension for planetary roller extruders and the sections.

In the region of the single-screw extruder parts 19 and 31, the associated housings have a smooth construction on the inner surface. Single-screw extruder part 31 possesses a four-threaded screw, and the single-screw extruder part 19 a single-threaded screw. The single-screw extruder part 19 is constructed at the same time as a sealing screw at the end which end is faced away from the planetary roller extruder parts. In other words and in accordance with at least one embodiment of the present invention, a multiply threaded screw, i.e. a multiple start screw can be used. For example the screw can have four separate threads, or be a 4-start screw.

The charging of starting material takes place in the form of plastics granulate entering through a charging hole 9. After the melting of the plastics granulate, gas propellant is added by metering at 10. In all the metering of gas propellant occurs in two stages. The second stage is designated by 15 and lies roughly centrally in the residence, mixing and cooling zone and in fact, at a distance from a further charging of starting material via a bypass and lateral-arm extruder 14.

The shut-off zones IV and VI between the planetary roller extruders include housing rings and blisters 23, 28. The blisters are in each case collar of the common shaft which fills the surrounding housing rings in such a manner that no important leakage flow occurs. In other words, and in accordance with at least one embodiment of the present invention, the blisters are disposed about the common shaft in such a way to act as collars, which collars, in conjunction with the surrounding housing, work in such a manner to substantially eliminate leakage. Provided directly in front of and after each collar are melt pipes 12 and 13 and respectively 17 and 18, which lead to gear pumps 11 and 16. Seated in front of the pump 11 is a melt filter (not shown) with a sieve changing device in the melt pipe. The melt filter serves to filter solids particles out of the melt. Consequently the service life of the pump can be extended.

Sensors for pressure and temperature are located in the melt pipes 12, 13 and 17 and 18. The measured values are used as control variables. Furthermore the temperature of the heating media and cooling media is measured. Corresponding sensors are disposed in the supply lines. Finally the current consumption of the extruder and of the pumps and their speed are also measured. These measured values are also used as control variables.

The stream of melt from the plasticising and mixing zone into the residence, mixing and cooling zone and respectively from the residence, mixing and cooling zone into the mixing and cooling zone may be controlled in any desired manner by means of the pumps 11 and 16.

The planetary roller extruder region of the residence, mixing and cooling zone consists of two sections which both have an opposed construction. The opposed construction has the effect described at the beginning. The section at the front in the direction of flow of the melt is at the same time oppositely directed to the planetary roller extruder section of the plasticising and mixing zone. As a result the mechanical forces of the planetary spindles acting on the shut-off zone IV are counterbalanced to a certain extent. In principle the housing part of the shut-off zone may be regarded as a common wearing ring of the planetary spindles 25 and 22. In the exemplified embodiment the wearing rings are represented in one piece with the housing for reasons of graphic simplification. The planetary spindles can be easily mounted by the use of separate rings.

FIGS. 2 and 3 show that the planetary spindles 25 and 27 of the extruder sections belonging to the residence, mixing and cooling zone are disposed offset in relation to one another. In the exemplified embodiment the offset is 30 degrees. FIG. 2 is a diagrammatical sectional representation from view B and FIG. 3 is a diagrammatical sectional representation from view A.

The planetary spindles mesh with the central spindle. Furthermore the planetary spindles mesh with internal toothing of the extruder housings 3, 5 and 7 Each housing possesses diagrammatically represented ducts in the housing casing, through which ducts cooling medium and if necessary a heating medium is passed. The ducts are formed by using a two-shell casing. Whereas the inner casing has an externally smooth construction as a bushing, recesses for the ducts are located in the outer casing. The recesses can be milled. On the outside the outer casing bears connections for the heating medium and cooling medium and their lines.

Water can be used as the cooling medium, and also as the heating medium. The water is subjected to excess pressure to reach temperatures of over 100 degrees Celsius.

One feature of the present invention resides broadly in an extruder, in particular for the foam extrusion of plastics, also for the incorporation of additives and aerating agents, in particular with the supply of relatively high-viscosity or low-viscosity polymers via a lateral-arm extruder, and also cooling to unmoulding temperature and supply into a moulding tool, with a pump being connected between at least two stages or zones, characterised in that at least one of the two stages/zones connected by the pump is constructed as a planetary roller extruder section.

Another feature of the present invention resides broadly in the extruder characterised by a division into: a plasticising and a melting and mixing zone; a residence, mixing and cooling zone; a mixing and cooling zone; the use of a planetary roller extruder section for one or more of the zones; an upstream feed zone, and a downstream discharge zone.

Yet another feature of the invention resides broadly in the extruder characterised by the use of a further planetary roller extruder for at least one of the zones.

Still another feature of the invention resides broadly in the extruder characterised by different planetary roller extruder sections.

Another feature of the present invention resides broadly in the extruder characterised in that the planetary roller extruders comprise different reference diameters of the internal toothing interacting with the planetary spindles and/or a different number of planetary spindles and/or a different arrangement of the planetary spindles (22, 25, 27, 30) on the reference diameter of the internal toothing and/or different lengths and/or different spindle pitches and/or different toothings.

Still another feature of the present invention resides broadly in the extruder characterised by a larger clearance between the teeth of the planetary roller extruder parts in the cooling zone.

Yet another feature of the invention resides broadly in the extruder characterised by a smaller clearance between the teeth of the planetary extruder parts in the plasticising zone.

Another feature of the invention resides broadly in the extruder characterised in that the planetary spindles (25) at least of one zone or section possess an opposed pitch and the section conveying in the opposite direction is overrun.

Still another feature of the invention resides broadly in the extruder characterised in that the overrunning pressure is applied by the sections which are at the front in the direction of transport and/or by an intermediate pump.

Another feature of the invention resides broadly in the extruder characterised in that a melt filter is provided in the stream of melt in front of the pump.

Still another feature of the invention resides broadly in the extruder characterised by a filter with a sieve changing device.

Another feature of the invention resides broadly in the extruder characterised in that in a single-stage design of the planetary roller section the residence, mixing and cooling zone possesses a pitch working in the opposite direction to the section of the plasticising and mixing zone (22).

Yet another feature of the invention resides broadly in the extruder characterised by a common wearing ring of the spindles (22, 25) working in opposite directions.

Still another feature of the invention resides broadly in the extruder characterised by a common central spindle/shaft for the different zones.

Yet another feature of the invention resides broadly in the extruder characterised in that the extruder zones connected to one another vias pumps (11, 16) are furthermore completely or partly shut off from one another.

Still another feature of the invention resides broadly in the extruder characterised by a blister (23, 28) of the central spindle as a shut-off device.

Another feature of the invention resides broadly in the extruder characterised in that the blister is surrounded by a thin stream of melt.

Still another feature of the invention resides broadly in the extruder characterised by the combination with at least one single-screw extruder section for the feed and/or melting zone.

Yet another feature of the invention resides broadly in the extruder characterised in that the screw of the single-screw extruder section at the same time forms the central spindle of the planetary roller extruder section in following zones and vice versa.

Still another feature of the invention resides broadly in the extruder characterised by a twin-screw extruder section for the feed and/or melting zone.

Another feature of the invention resides broadly in the extruder characterised in that a screw of the twin-screw extruder section at the same time forms the central spindle of the planetary roller extruder section in following zones and vice versa.

Still another feature of the invention resides broadly in the extruder characterised in that the screw of the twin-screw extruder connected to the central spindle of the planetary roller extruder section is longer than the other screw of the twin-screw extruder section and/or is offset with respect to the other screw of the twin-screw extruder section, so that it projects with respect to the other screw of the twin-screw extruder section towards the planetary roller extruder section.

Yet another feature of the invention resides broadly in the extruder characterised in that when a single-screw extruder section is used for the feed zone or charging zone, the associated cylinder is grooved in the longitudinal direction and/or spirally in the direction of transport.

Still another feature of the invention resides broadly in the extruder characterised in that the grooves extend over an axial length of the extruder of at least 1 D, with D being the reference diameter of the screw.

Another feature of the invention resides broadly in the extruder characterised by a length of 3 to 4 D.

Still another feature of the invention resides broadly in the extruder characterised by a larger thread-depth of the screw in the inlet zone and the feed zone.

Another feature of the invention resides broadly in the extruder characterised by a propellant gas supply (10, 15) in the plasticizing and mixing zone and/or in the residence, mixing and cooling zone.

Yet another feature of the invention resides broadly in the extruder characterised by a propellant supply after a blister.

Still another feature of the invention resides broadly in the extruder characterised by an injection pressure of 40 to 50 bar in the application to the extrusion of polystyrene.

Another feature of the invention resides broadly in the extruder characterised in that the further supply of polymer (14) takes place between the plasticising and mixing zone and the residence, missing and cooling zone.

Another feature of the invention resides broadly in the extruder characterised in that the pumps (11, 16) are constructed as gear pumps.

Still another feature of the invention resides broadly in the extruder characterised by a reduced conveying action of the planetary roller extruder and a setting of the residence time in the extruder with the aid of the pump (11, 16).

Yet another feature of the invention resides broadly in the extruder characterised in that the planetary spindles (25, 27) of the one section are disposed offset to the other section.

Another feature of the invention resides broadly in the extruder characterised by a larger diameter in the mixing and cooling zone (VII) in front of the discharge end.

Another feature of the invention resides broadly in the extruder characterised by a change in the screw diameter in the discharge zone (VIII) to kill the melt.

Yet another feature of the invention resides broadly in the extruder characterised by an increase in diameter in the discharge zone (VIII).

Another feature of the invention resides broadly in the extruder characterised by a porcupine head on the delivery-side end of the central spindle (31).

Still another feature of the invention resides broadly in the extruder characterised by a length of the porcupine head of 0.5 to 1.5 D, with D being the reference diameter of the porcupine.

Still another feature of the invention resides broadly in the extruder characterised by a calming pipe in the delivery zone.

Yet another feature of the invention resides broadly in the extruder characterised in that the discharge zone has a length of 1 to 5 D, with D being the external diameter of the central spindle/screw in the discharge zone.

Another feature of the invention resides broadly in the extruder characterised by a sealing screw on the entry side.

Still another feature of the invention resides broadly in the extruder characterised in that the sealing screw is a part of the central spindle.

Another feature of the invention resides broadly in the extruder characterised in that the length of the sealing screw is 1 to 3 D, with D being the reference diameter of the sealing screw.

Another feature of the invention resides broadly in the extruder characterised by a single-flighted feed screw.

Yet another feature of the invention resides broadly in the extruder characterised by a stuffing box with lid on the sealing screw, with the sealing screw comprising a smooth shaft in the region of the stuffing box and a graphite Teflon packing being used in the stuffing box.

Still another feature of the invention resides broadly in the extruder characterised in that the packing consists of a cord with a rectangular or square cross section.

Still another feature of the invention resides broadly in the extruder characterised in that the external radius of the path of movement of the rotating planetary spindles of an extruder section in the direction of flow of the melt through the extruder is smaller than the external radius of the path of movement of the planetary spindles of the following extruder section.

Another feature of the invention resides broadly in the extruder characterised in that the planetary spindles of the individual sections differ from one another with respect to the reference diameter by up to 20%.

Yet another feature of the invention resides broadly in the extruder characterised by a melt temperature in the mixing zone of 170 to 240 degrees Celsius.

Still another feature of the invention resides broadly in the extruder characterised by a temperature of roughly 200 degrees Celsius for the processing of polystyrene, of roughly 140 degrees Celsius for polyethylene and roughly 240 degrees Celsius for polypropylene.

Another feature of the invention resides broadly in the extruder characterised by a melt temperature in the cooling zone of 220 to 110 degrees Celsius.

Yet another feature of the invention resides broadly in the extruder characterised by a multiple-start screw in the discharge zone.

Yet another feature of the invention resides broadly in the extruder characterised by a 4-start screw.

Still another feature of the invention resides broadly in the extruder characterised by the mixing of further polymers and/or additives and/or aerating agents in the residence, mixing and cooling zone.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding Federal Republic of Germany and international patent publication applications, namely, Federal Republic of Germany Patent Application No. DE 195 39 203.5, filed on Oct. 21, 1995, having inventor Klaus Dieter Kolossow, and DE-OS 195 39 203.5 and DE-PS 195 39 203.5 and International Application No. PCT/EP96/04556, published as WO97/15433 on May 1, 1997, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

Examples of two-stage extruders, embodiments of which may be incorporated in embodiments of the present invention, may be found in the following U.S. Patents: U.S. Pat. No. 5,393,213, entitled "Serial Two-Stage Extruder", issued Feb. 28, 1995; U.S. Pat. No. 5,415,473, entitled "Cone Type Twin Screw Extruder Having Gear Reduction System", issued May 16, 1995; U.S. Pat. No. 5,417,155, entitled "Counter-Rotation Twin-Screw Extruder for Extracting Juice", issued May 23, 1995; U.S. Pat. No. 5,438,097, entitled "Polystyrene Modified with Silicone Rubber Powder", issued Aug. 1, 1995; U.S. Pat. No. 5,456,923, entitled "Method of Manufacturing Solid Dispersion", issued Oct. 10, 1995; U.S. Pat. No. 5,391,594, entitled "Method for Imparting Fire Retardancy to Organic Resins", issued Feb. 21, 1995; and U.S. Pat. No. 5,420,303, entitled "Process for the Maleation of Polyethylene Waxes", issued May 30, 1995.

Examples of single-screw extruders, embodiments of which may be incorporated in embodiments of the present invention, may be found in the following U.S. Patents: U.S. Pat. No. 5,393,796, entitled "Method and Apparatus for Extruding a Low Density Thermoplastic Foam", issued Feb. 28, 1995; U.S. Pat. No. 5,412,014, entitled "Fire Retardant Resin Compositions", issued Oct. 26, 1993; U.S. Pat. No. 5,393,213, entitled "Serial Two-Stage Extruder", issued Feb. 28, 1995; and U.S. Pat. No. 5,470,513, entitled "Controlling Screw Speed to Injection Compression Molding Machine, issued Nov. 28, 1995.

Examples of additives which may be used in conjunction with embodiments of the present invention may be found in the following U.S. Patents: U.S. Pat. No. 5,444,111, entitled "Ammonium Chloride as a PVC Cc-Stabilizer", issued Aug. 22, 1995; U.S. Pat. No. 5,441,801, entitled "Advanced Polymer/Wood Composite Pellet Process"; issued Aug. 15, 1995; U.S. Pat. No. 5,439,975, entitled "Thermoplastic Polyetheramide/Styrene Copolymar Composition, issued Aug. 8, 1995; U.S. Pat. No. 5,424,125, entitled "Monofilaments from Polymer Blends and Fabrics Thereof", issued Jun. 13, 1995; U.S. Pat. No. 5,411,785, entitled "Manufacture of Composite Extrusions", issued May 2, 1995; U.S. Pat. No. 5,387,386, entitled "Extrusion Method and Apparatus", issued Feb. 7, 1995; U.S. Pat. No. 5,454,995, entitled "Method for Reducing Cycle Time in an Injection Molding Machine", issued Oct. 3, 1995; and U.S. Pat. No. 5,401,154, entitled "Apparatus for Compounding a Fiber Reinforced Thermoplastic Material and Forming Parts Therefrom", issued Mar. 28, 1995.

Examples of aerating materials and other material additives for making foamed extrusins, which may be incorporated in embodiments of the present invention, may be found in the following U.S. Patents: U.S. Pat. No. 5,391,610, entitled "Moisture Cured Elastomeric Interpenetrating Network Sealants", issued Feb. 21, 1995; U.S. Pat. No. 5,424,014, entitled "Method for Extruding Foamable Polymer Material", issued Jun. 13, 1995; U.S. Pat. No. 5,472,639, entitled "Electroconductive Foams", issued Dec. 5, 1995; U.S. Pat. No. 5,470,888, entitled "Process for Foaming Flame Retardant Polystyrene and Polystyrene Shaped Articles", issued Nov. 28, 1995; and U.S. Pat. No. 5,475,037, entitled "Amorphous Polyester Foam", issued Dec. 12, 1995.

Examples of extrusion heads which may be incorporated in embodiments of the present invention, may be found in the following U.S. Patents: U.S. Pat. No. 5,393,216, entitled "Modular Tubular Extrusion Head and a Process for Extruding Tubular Articles" issued Feb. 28, 1995; and U.S. Pat. No. 5,470,513, entitled "Controlling Screw Speed to Injection Compression Molding Machine", issued Nov. 28, 1995.

Examples of extruders for polymers, which may be incorporated in embodiments of the present invention, may be found in the following U.S. Patents: U.S. Pat. No. 5,393,217, entitled "Coextrusion Apparatus"; U.S. Pat. No. 5,404,967, entitled "Extruding Device"; U.S. Pat. No. 5,407,338, entitled Manual Resin Extruder for Effecting Glass Repair; U.S. Pat. No. 5,437,545, entitled "Method and apparatus for extruding powdered material; U.S. Pat. No. 4,965,304, entitled "Extrudable Polymeric Compositions"; U.S. Pat. No. 5,027,976, entitled "Multi-Orifice T-Bar Nozzle"; and U.S. Pat. No. 5,115,029, entitled "Extrudable Polymeric Composition".

Other examples of extruders which may be used in conjunction with embodiments of the present invention may be found in the following U.S. Patents: U.S. Pat. No. 4,843,734 issued to Varwig; U.S. Pat. No. 4,836,271 issued to Reichelt et al.; U.S. Pat. No. 4,884,624, issued to Pleschiutschnigg et al.; U.S. Pat. No. 5,110,283 issued to Bluml et al.; U.S. Pat. No. 5,038,848, issued to Grothe; U.S. Pat. No. 5,125,251, issued to Pettersson et al.; and U.S. Pat. No. 5,242,485, issued to Dittrich.

Examples of planetary gear systems, which may be incorporated in embodiments of the present invention, may be found in the following U.S. Patents: U.S. Pat. No. 5,679,087 to Lutz; U.S. Pat. No. 5,685,798 to Lutz et al.; U.S. Pat. No. 5,551,928, issued to Sudau; U.S. Pat. No. 5,634,866, issued to Sudau; and U.S. Pat. No. 4,995,861, issued to Erlbruch.

Examples of pumps which may be incorporated in embodiments of the present invention may be found in the following U.S. Patents: U.S. Pat. No. 5,381,927; U.S. Pat. No. 5,388,972; U.S. Pat. No. 5,397,035; U.S. Pat. No. 5,421,310; U.S. Pat. No. 5,445,288; U.S. Pat. No. 5,453,000; U.S. Pat. No. 5,462,413; and U.S. Pat. No. 5,476,638.

Examples of gearing for extruders which may be incorporated in embodiments of the present invention, may be found in the following U.S. Patents: U.S. Pat. No. 5,441,750; U.S. Pat. No. 5,441,687; U.S. Pat. No. 5,431,412; U.S. Pat. No. 5,351,369; U.S. Pat. No. 5,360,330; U.S. Pat. No. 5,167,905; U.S. Pat. No. 5,105,644; and U.S. Pat. No. 5,102,323.

The details in the patents, patent applications and publications may be considered to be incorporable, at applicant's option, into the claims during prosecution as further limitations in the claims to patentably distinguish any amended claims from any applied prior art.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A method for the foam extrusion of plastics with an extruder with the incorporation of additives and aerating agents, in particular with the supply of relatively high-viscosity or low-viscosity polymers via a lateral-arm extruder, and also cooling to unmoulding temperature and supply into a moulding tool, the extruder comprising: multiple extruding zones; a pump being connected between at least two zones; at least one of the two zones connected by the pump is constructed as a planetary roller extruder section, said method comprising:

supplying granulated plastic to a zone of the extruder;

supplying additives and aerating compounds to another zone of the extruder;

pumping plastic between zones of the extruder;

pumping plastic through the planetary roller extruder section using the pump;

cooling the material; and producing extruded plastic.

* * * * *

UNITED STATES PATENT AND TRADEMARK OFFICE
CERTIFICATE OF CORRECTION

PATENT NO. : 6,074,084
DATED : June 13, 2001
INVENTOR(S) : Klaus Dieter Kolossow Page 1 of 1

It is certified that error appears in the above-identified patent and that said Letters Patent is hereby corrected as shown below:

Title page,
Item [73], after "Assignee:", delete "Gefinex-Jackson" and insert -- Gefinex-Jackon --.

Column 2,
Line 46, after "The" insert -- present --.

Column 4,
Line 3, after "offset" insert -- with --.
Line 45, after "an", delete "increase" and insert -- increasing --.
Line 61, after "killed" insert -- or calmed --.

Column 5,
Line 16, after the first occurrence of "roughly" insert -- about --.

Signed and Sealed this

Twenty-eighth Day of May, 2002

Attest:

JAMES E. ROGAN
*Director of the United States Patent and Trademark Office*

*Attesting Officer*